United States Patent
Parrent, Jr.

[11] 3,749,489
[45] July 31, 1973

[54] OPTICAL IMAGING
[75] Inventor: George B. Parrent, Jr., Carlisle, Mass.
[73] Assignee: Technical Operations, Incorporated, Burlington, Mass.
[22] Filed: July 1, 1965
[21] Appl. No.: 469,977

[52] U.S. Cl. .................................. 355/52, 355/34
[51] Int. Cl. ........................................ G03b 27/68
[58] Field of Search ....................... 88/1.51 R, 106; 350/311, 314; 35/2, 3; 355/52

[56] References Cited
UNITED STATES PATENTS
3,178,993  4/1965  Ferris et al.............................. 88/1
3,178,997  4/1965  Kelly...................................... 88/24

Primary Examiner—Verlin R. Pendegrass
Attorney—Alfred H. Rosen

[57]  ABSTRACT

The specification discloses optical systems for forming aberrated images of objects, and for forming true images of the objects from the aberrated images, using light filters in the path of image-forming light. Filters are shown located in a Fourier transform plane, and in the principal plane of an image-forming lens system.

22 Claims, 4 Drawing Figures

PATENTED JUL 31 1973            3,749,489

INVENTOR
GEORGE B. PARRENT JR.

BY *Alfred H. Rosen*
*Thomas N. Tarrant*
ATTORNEYS

OPTICAL IMAGING

This invention relates to optical image scrambling and unscrambling and in particular to image scrambling by scrambling introduced by a filter in an imaging system.

The extensive use of credit and checking accounts today together with the ever increasing concentrations of populations have made it desirable to identify people or their signatures other than by previous personal knowledge. Various systems of identification have been used including stamped metal identification cards, cards with magnetic or other digital codes, and sealed cards with photographs.

The use of scrambled photographs and signatures has been receiving increasing interest as a fool-proof foolproff method of identification.

One known method of scrambling uses fiber optics between an original to be scrambled and a photographic film for recording the scrambled image. The various fibers are twisted about in a disordered fashion, so that light coming from any part of the original to be reproduced goes to some part of the film that has no particular relationship to the part of the original from which it was transmitted. The result is something completely unrecognizable; but, the developed and printed film can be used to reconstruct the original provided the same identically disordered set of fiber optics are used.

A person obtaining a lost identification card which showed only an image, scrambled as above, would have no idea whom the card identifies. The card could only be used by the correct person, going to his bank, or to whatever agency from which the card entitled him to credit, identifying himself, and then letting them unscramble his card with their fiber optic system to show that it matched his claimed identity.

While the fiber optics systems operate quite well, there are many other systems that have been tried, and each one presents some difficulties. With the fiber optic system it is only economically feasible to use a small plate of fiber optics suitable for a signature in still operation. The complexity of scanning is required for anything much larger than a signature. This is due to the high cost of fiber optics.

Scrambling is also done electronically by converting an optical image to electrical signals and performing scrambling operations on the electrical signals. This again requires complex and costly equipment.

Now, in accordance with the present invention, it has been found that removable distortion can be introduced into an optical image by the use of aberrating lenses and/or filters in an optical imaging system. Basically, the invention comprises illuminating a subject and optically forming an image of the subject with a lens system. Then, a known aberration is introduced into the lens system rendering the image unrecognizable. A record is made of the unrecognizable image. The record is used in an image system to form a second image. A prescribed aberration is introduced in forming the second image so related to the known aberration that the second image becomes a recognizable reproduction of the original subject.

There are various ways in which the invention may be realized using different forms of optical system and different forms of illuminating light. Each system requires illuminating light of narrow spectral width. However, a first class of system uses collimated quasi-monochromatic coherent light. A second class of system illuminates the original subject with incoherent light and illuminates the record image with collimated quasi-monochromatic coherent light. A third class of system uses incoherent light in both instances.

The first class of system is the easiest to approach from a scientific point of view because of the relative ease of manipulating collimated quasi-monochromatic coherent light. Light, in this category, can be treated very much in the way rf waves are treated and no complications are added by incoherence in the energy being handled. In practice it is found that this class of system has its problems. Very careful treatment is required of the aberrating function to insure that scientific analysis of the aberrated image will not make it possible for skilled people to reproduce both the aberrating and deaberrating devices. Also, when coherent light is required, it is necessary that the original subject be a transparency. When coherent light is diffusely reflected, the coherency is lost so that diffuse reflection from an opaque original cannot be used to obtain an image in the first class of system.

The second class of system is perhaps an improvement over the first class, but requires two different types of illuminating light: One is coherent light and one is incoherent light.

Each class of system also places its own limitations on the types of aberrating devices that are preferred for use with the system. Aberration can be introduced by amplitude filters, and/or phase filters.

The present application describes only the third class of system in detail since the incoherent-incoherent operation is the most complex, from the theoretical point of view, and at the same time, is perhaps the most practical for commercial purposes. Thus, it is an object of the invention to define a process for controllably aberrating and deaberrating images.

It is a further object of the invention to define a complex lens optical system for aberrating and deaberrating optical images.

It is a further object of the invention to define means and process for optical image aberrating and deaberrating using incoherent light.

Further objects and features of the present invention will become apparent while reading the following specification together with the drawings in which.

Figure 1:
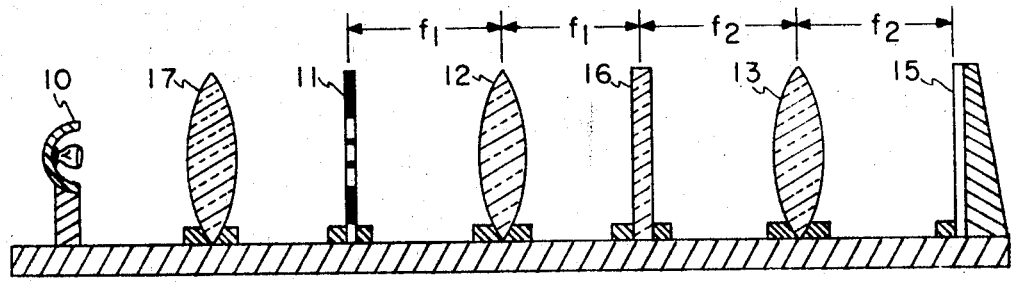
FIG. 1 is a diagrammatic illustration of a complex lens system or aberrating and deaberrating images in accordance with the invention.

The basic optical system for aberrating, in accordance with the present invention, is illustrated in FIG. 1.

FIG. 1 is the basic embodiment for operation of the classes of systems in accordance with the invention. This is used as the basic embodiment partly because of the ease of mathematical analysis. Thus, in FIG. 1, a light source 10, is arranged to illuminate a transparent subject 11, positioned in the front focal plane of a first lens 12. The physical separation between subject 11 and lens 12 is indicated by $f_1$ to show that the subject is placed in front of lens 12 a focal length away. Under these circumstances, lens 12 images subject 11 at infinity. Accordingly, a second lens 13 is introduced to image the subject 11 on an image-receiving medium 15.

The Fourier transform of the subject appears in the back focal plane of lens 12, in what we call the transform plane. It is in the transform plane that we add a device such as a filter 16 for producing aberrations in the image. By positioning lens 13 its own focal length ($f_2$) from filter 16, and by placing an image-receiving medium 15 in the back focal plane of lens 13, we add a second Fourier transform which gives us back an image of our original subject plus aberrations introduced by filter 16. Since in the Fourier transform plane the optical image is redistributed in accordance with its frequency components, aberrations introduced in this plane, even with a relatively simple Ronchi ruling, can lead to gross changes in the appearance of the final image rendering it completely unrecognizable. By using a photographic film for image-receiving medium 15, developing the film and substituting the aberrated image so developed in the subject plane of FIG. 1, a recognizable image of the original subject will be formed in the back focal plane of lens 13. A third lens, 17, can be used as a collimater in a system using collimated, quasi-monochromatic coherent light, in which case, light source 10 should approximate a point source suitably filtered.

Figure 2:
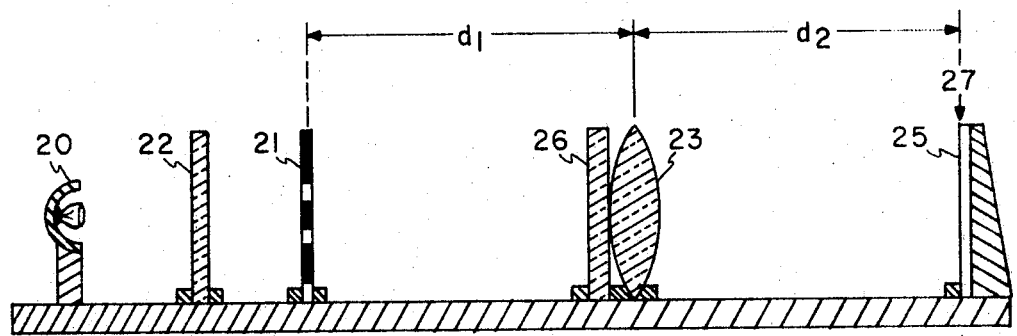
FIG. 2 is a diagrammatic illustration of an image aberrating system in accordance with the invention.
Figure 3:
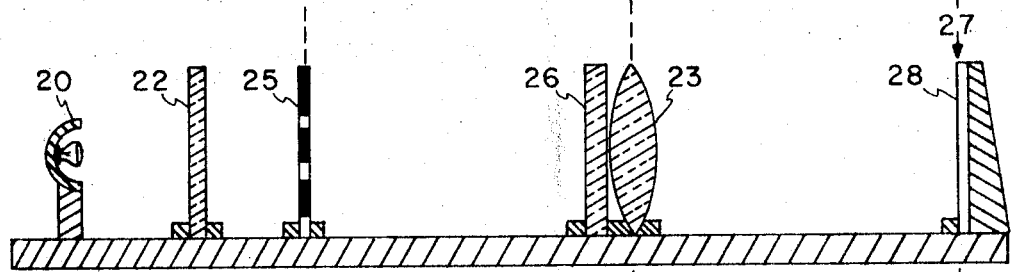
FIG. 3 is a diagrammatic illustration of an image deaberrating system in accordance with the present invention.
Figure 4:
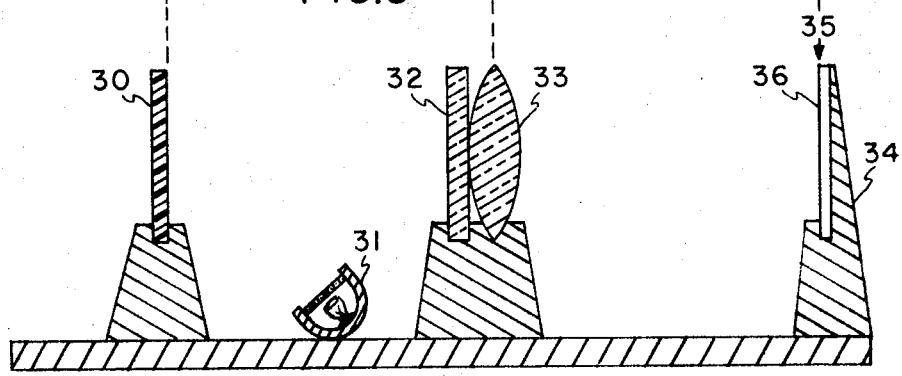
FIG. 4 is a diagrammatic illustration of a system using reflected light for image aberrating and deaberrating in accordance with the present invention.

While FIG. 1 is illustrated as the general case of an optical system in accordance with the inventive principle, FIGS. 2, 3, and 4 are specific and more detailed embodiments found suitable for use with incoherent light of narrow spectral width.

Light source 20, in FIG. 2, is a narrow spectrum light source preferably having a spectral width of less than 400 angstroms. Various fluorescent, vapor, and arc lamps are available with a narrow spectral width and are suitable for use in the present invention. Other light sources may be used with appropriate filtering. As the spectral width is increased beyond 400 angstroms, reconstructed images, in accordance with the invention will be less and less legible. A 400 angstrom width will provide good legibility in reconstructed images for most uses. Narrower spectral widths will improve the final reconstructed image to some degree.

An original to be aberrated, which we will call subject 21, is positioned a short distance in front of the light source. Subject 21 must only be separated from light source 20 by a distance to provide fairly even light distribution over the subject. A light diffusing screen, such as ground-glass plate 22, may be interposed between light source 20 and subject 21, to improve the uniformity of light distribution.

An image lens 23 is positioned a distance $d_1$ from subject 21, and a photographic film, 25, is supported at a distance $d_2$ from lens 23. Distances $d_1$ and $d_2$ are any distances that together establish conjugate foci for lens 23. Thus, subject 21 is imaged at the position of photographic film 25. The filter 26 is introduced at approximately the plane of lens 23. So that filter 26 can occupy substantially the plane of lens 23, it is desirable to use a complex lens such as a telephoto type lens in which the principal plane of the lens is located in space permitting the introduction of a filter. When using a simple lens, the filter 26 must be placed immediately adjacent to the lens to avoid the introduction of undesired distortion in the image processes of the present invention. Filter 26 must follow a function that is symmetrical in both directions and preferably is designed in accordance with the relationship: $R > \mu_{max} \lambda d_1 / 2\pi$.

Where

R equals the radius of filter 26.

$\mu_{max}$ equals the maximum spatial frequency in subject 21.

$\lambda$ equals the mean wave length of light source 20.

$d_1$ is the distance between subject 21 and filter 16.

While the system may be operable where R is less than that stated as preferred in the relationship above, there will be some loss in a reconstructed image due to loss of high resolution in subject 21.

FIG. 3 illustrates essentially the identical system as FIG. 2, with light source 20 diffusing screen 22, filter 26, lens 23, and an image plane 27. Film 25 is developed to form an aberrated image of subject 21, and then is placed for deaberrating in the subject plane of FIG. 3. Distances $d_1$ and $d_2$ are the same in the aberrating operation as in the deaberrating process, and deaberrating may be performed using the same identical optical system as used for aberrating, merely by substituting the aberrated image in place of the subject, and reproducing it back as the original subject in image plane 27. A display screen 28 may be used for viewing the deaberrated image at plane 27 or it may be recorded again using a photosensitive element.

Since the system of the present invention is also operative using diffusely reflected light from an original subject, FIG. 4 illustrates the system both for aberrating and deaberrating in which reflected, rather than transmitted light, is utilized.

Thus, in FIG. 4, the light source is illustrated by lamps 31, positioned to illuminate a subject 30. Filter 32 is positioned distance $d_1$ from subject 30, and immediately adjacent to lens 33. Means 34, to support an image-receiving medium 36 is positioned in image plane 35 at distance $d_2$ from filter 32 and lens 33. For deaberrating, the scrambled image is substituted for subject 30. As can be seen, the system of FIG. 4 is identical to the system of FIG. 2 except for the use of reflected light instead of transmitted light. Suitable filters following symmetrical functions for use in the present invention are periodic phase gratings, and amplitude gratings having light and dark lines of even size and spacing. Circular patterns and mosaics may also be utilized as long as they obey the previously stated requirement that they follow functions that are symmetrical in both directions.

While it is impractical to illustrate the filters for use in the present invention, the meaning of symmetrical functions and odd and even symmetry can be readily explained. The symmetry may be with regard to one or two axes transverse to and through the center of the optical axis of the system. A first axis of symmetry may be any arbitrary axis in accordance with the above. But where two axes are involved, the second axis must be perpendicular to the first in the plane transverse to the optical axis of the system.

The symmetry requirement is that if the filter were folded about an axis each quadrant would meet either a complete mirror counterpart or else a complete reversal of values. If a filter were folded in this manner, there would be even symmetry wherever a quadrant met its mirror counterpart and odd symmetry wherever a quadrant met a reversal of values.

A simple example is a line filter having equal dark and light bands. Even symmetry exists when one of the bands is bisected by a transverse axis through the center of the optical axis of the system. Odd symmetry exists when one edge of a band is coincident with a transverse axis through the center of the optical axis of the system.

With the simple line filter we have only one-dimensional symmetry with only one transverse axis capable of having any relevance. This is turned to a two-dimensional symmetry situation when the light lines turn to dark lines and vice versa upon crossing a transverse axis. Thus if the lines are vertical and one line is bisected by a vertical axis there is even symmetry at the vertical axis. If the same filter has a reversal of dark and light on crossing a horizontal axis then the filter has even symmetry about the vertical axis and odd symmetry about the horizontal axis.

The same considerations apply when the phase, or amplitude modulating components of the filter describe circles, mosaics or any other geometry which can comply with the symmetry requirement.

While the invention has been described in relation to a specific embodiment, various modifications thereof will be apparent to those skilled in the art and it is intended to cover the invention broadly within the spirit and scope of the appended claims.

What is claimed is:

1. The process of controllably aberrating and then deaberrating images of an object comprising the steps of:
   a. Imaging said object with light of limited spectral width through an optical system having aberration properties spatially distributed according to a prescribed pattern substantially in the principal plane of said imaging system;
   b. making a record of the aberrated image formed by said system; and,
   c. imaging the recorded aberrated image with light having limited spectral width through an optical system having prescribed aberration properties so related to the aberration properties of the first-named system that the aberrated image is deaberrated.

2. The process according to claim 1 in which said limited spectral width is in each system limited to a range no greater than about 400 angstroms.

3. The process according to claim 2 in which said known aberration properties and said prescribed aberration properties are the same.

4. The process according to claim 2 in which said aberration properties are introduced in each system as phase variations.

5. The process according to claim 2 in which said aberration properties are introduced in each system as amplitude variations.

6. The process according to claim 2 in which said aberration properties are introduced in each system as a combination of phase and amplitude variations.

7. The process according to claim 2 in which said making a record is a photosensitive recording process.

8. The process according to claim 2 in which said optical system in each instance comprises a complex lens system with said aberration properties introduced between elements of said lens system.

9. An optical image aberrating system comprising:
   a. a light source having a spectral width of less than 400 angstroms for illuminating a subject to be aberrated;
   b. an imaging lens;
   c. means to support a subject to be illuminated and an image-receiving medium at first and second respective conjugate foci of said lens; and
   d. a symmetrical function aberrating filter positioned substantially in the principal plane of said lens 10. An optical image aberrating system according to claim 9, in which said image lens is of the type exemplified by a telephoto lens having a principal plane external to the lens itself, and said filter is positioned in said plane.

11. An optical image aberrating system according to claim 9, in which the radius of said filter is greater then $\mu_{max}\lambda d_1/2\pi$
Where:
$\mu_{max}$ = maximum spatial frequency in said subject
$\lambda$ = mean wave length of said light source, and
$d_1$ is the distance between said subject and said filter 12. An optical image aberrating system according to claim 9, in which said symmetrical function is even.

13. An optical image aberrating system according to claim 9, in which said symmetrical function is odd.

14. An optical image aberrating system according to claim 9, in which said image receiving medium is a photosensitive recording medium.

15. A system for aberrating and deaberrating an optical image comprising:
   a. a light source having a spectral width of less than 400 angstroms
   b. an imaging lens
   c. a symmetrical function aberrating filter positioned substantially in the principal plane of said lens
   d. means to support a subject for illumination by said source to be imaged by said lens; and
   e. means to intercept an image formed by said lens, whereby an original subject supported by said means to support is intercepted as an aberrated image at said means to intercept and an aberrated image supported on said means to support is intercepted at said means to intercept as a deaberrated image 16. A system for aberrating and deaberrating according to claim 15, in which said light source is arranged to transmit light through said subject.

17. A system for aberrating and deaberrating according to claim 16, in which a light diffusing screen is positioned between said light source and said means to support a subject.

18. A system or aberrating and deaberrating according to claim 15, in which said light source is arranged to diffusely reflect light from a subject positioned on said means to support.

19. An optical image aberrating system comprising:
   a. means to support a subject to be aberrated
   b. a telephoto type lens
   c. means to support an image receiving medium
   d. a symmetrical function aberrating filter positioned in the principal plane of said lens; said means to support a subject being separated from said filter by a first distance, and said means to support an image-receiving medium being separated from said filter by a second distance such that said first distance and said second distance place said subject and said image-receiving medium at conjugate foci of said lens; and e. a light source having a spectral width of less than 400 angstroms positioned for diffusely reflecting light from said subject through said filter and said lens onto said image-receiving medium.

20. An optical image aberrating system comrising:

a. a light source having a spectral width of less than 400 angstroms for illuminating a subject to be aberrated b. an imaging lens arranged to form an image of a subject illuminated by said source in an image plane c. means to support a photosensitive recording medium in said image plane; and, d. a symmetrical function modulating filter positioned substantially in the principal plane of said lens.

21. An optical image aberrating system according to claim 20, in which said modulating filter is a phase-modulating filter.

22. An optical image aberrating system according to claim 20, in which said modulating filter is an amplitude modulating filter.

* * * * *

UNITED STATES PATENT OFFICE
CERTIFICATE OF CORRECTION

Patent No. 3,749,489           Dated July 31, 1973

Inventor(s) George B. Parrent, Jr.

It is certified that error appears in the above-identified patent and that said Letters Patent are hereby corrected as shown below:

Column 1, line 15, after "a" insert --more-- lines 15 and 16, delete "fool-proff"

line 64, change "system" to --systems--

Column 2, line 48, change "or" to --for--

Column 5, line 17, change "at" to --about--

Column 6, line 55, change "or" to --for--

Signed and Sealed this

Twenty-seventh Day of July 1976

[SEAL]

Attest:

RUTH C. MASON
*Attesting Officer*

C. MARSHALL DANN
*Commissioner of Patents and Trademarks*